(12) United States Patent
Zheng et al.

(10) Patent No.: US 10,138,337 B2
(45) Date of Patent: Nov. 27, 2018

(54) POLYMER/POTASSIUM PERMANGANATE COMPOSITE FILM AND PREPARATION METHOD THEREOF

(71) Applicant: FUZHOU UNIVERSITY, Fuzhou, Fujian (CN)

(72) Inventors: Yuying Zheng, Fujian (CN); Zhimin Fan, Fujian (CN)

(73) Assignee: FUZHOU UNIVERSITY, Fuzhou, Fujian (CN)

( * ) Notice: Subject to any disclaimer, the term of this patent is extended or adjusted under 35 U.S.C. 154(b) by 303 days.

(21) Appl. No.: 15/109,116

(22) PCT Filed: Jan. 4, 2015

(86) PCT No.: PCT/CN2015/070012
§ 371 (c)(1),
(2) Date: Jun. 29, 2016

(87) PCT Pub. No.: WO2015/131663
PCT Pub. Date: Sep. 11, 2015

(65) Prior Publication Data
US 2016/0326324 A1 Nov. 10, 2016

(30) Foreign Application Priority Data

Mar. 7, 2014 (CN) .......................... 2014 1 0081280

(51) Int. Cl.
| | |
|---|---|
| *C08J 5/18* | (2006.01) |
| *C08K 9/06* | (2006.01) |
| *C08L 75/04* | (2006.01) |
| *C08G 18/83* | (2006.01) |
| *B29C 41/24* | (2006.01) |
| *B29C 41/46* | (2006.01) |
| *C08K 3/24* | (2006.01) |
| *C08L 77/00* | (2006.01) |
| *B29L 7/00* | (2006.01) |
| *B29L 31/00* | (2006.01) |

(52) U.S. Cl.
CPC ................ *C08J 5/18* (2013.01); *B29C 41/24* (2013.01); *B29C 41/46* (2013.01); *C08G 18/837* (2013.01); *C08K 3/24* (2013.01); *C08K 9/06* (2013.01); *C08L 75/04* (2013.01); *B29L 2007/008* (2013.01); *B29L 2031/712* (2013.01); *C08J 2323/06* (2013.01); *C08J 2323/12* (2013.01); *C08J 2327/06* (2013.01); *C08J 2375/04* (2013.01); *C08J 2377/00* (2013.01); *C08K 2201/008* (2013.01); *C08K 2201/012* (2013.01); *C08L 77/00* (2013.01)

(58) Field of Classification Search
CPC . C08J 5/18; B29C 41/24; B29C 41/46; C08K 3/24; C08K 9/06; C08L 75/04; C08G 18/837
USPC ........................................................ 264/101
See application file for complete search history.

(56) References Cited

U.S. PATENT DOCUMENTS 3,154,608 A * 10/1964 Aronsen ............. B29C 47/8865
264/101

FOREIGN PATENT DOCUMENTS

| CN | 102079834 | 6/2011 |
|---|---|---|
| CN | 103819799 | 5/2014 |
| JP | 3-297347 | 12/1991 |
| WO | 93/02130 | 2/1993 |

OTHER PUBLICATIONS

International Preliminary Report on Patentability (Chapter 1) for PCT/CN2015/070012 dated Sep. 13, 2016 and its English translation.
International Search Report for PCT/CN2015/070012 dated Apr. 9, 2015 and its English translation from WIPO.
Written Opinion of the International Searching Authority for PCT/CN2015/070012 dated Apr. 9, 2015 and its English machine translation by Google Translate.

* cited by examiner

*Primary Examiner* — Michael N Orlando
*Assistant Examiner* — Elizabeth Bradford
(74) *Attorney, Agent, or Firm* — Luoh J. Wu; Continent Patent Office LLP

(57) ABSTRACT

This present invention discloses a polymer/potassium permanganate composite film obtainable by a process comprising the steps of using silane coupling agent for surface treatment of potassium permanganate, mixing 0.15-0.75 g of modified potassium permanganate with 10-20 g of polymers together to obtain a mixture, and coating the mixture to obtain a composite film. The composite film can absorb ethylene generated by fruit, thus extending fruit ripening time, keeping fruit fresh. It can be widely used as food packaging materials. The composite film also has a good oxygen barrier property and has a good efficiency to remove bacteria. Therefore it can be widely used in the pharmaceutical industry. The preparation method is scientifically sound, simple, and has high level of operability, thus making it possible for batch preparation.

2 Claims, No Drawings

POLYMER/POTASSIUM PERMANGANATE COMPOSITE FILM AND PREPARATION METHOD THEREOF

CROSS-REFERENCE TO RELATED APPLICATION(S)

This application is the U.S. National Stage of International Patent Application No. PCT/CN2015/070012 filed on Jan. 4, 2015, which claims the priority to Chinese Patent Application No. 201410081280.3 filed on Mar. 7, 2014, the disclosures of which are hereby incorporated in their entireties by reference.

FIELD AND BACKGROUND OF THE INVENTION

This present invention, wherein a polymer/potassium permanganate composite film and its preparation method are disclosed, belongs to the field of polymer composite films.

With the improvement of gross national product, people have higher standard of living, and pay more and more attention to food packaging materials.

Generally, fruit produces ethylene during natural ripening. The more ripe the fruit, the more ethylene it will give off. Once the fruit is fully ripe, the content of ethylene drops. Ethylene is commonly used to speed up fruit ripening. The ripening effect depends on three main factors: appropriate temperature, sufficient oxygen, and appropriate enzyme. The respiratory intensity and permeability of oxygen of fruit increase greatly after being treated with ethylene, which promotes fruit respiration. Ethylene also increases fruit enzyme activity, and can change the direction of enzyme movement, so as to shorten the time for fruit to mature, and to achieve the goal of ripening. If food packaging materials can absorb ethylene generated by fruits, then they can lengthen fruit ripening time, keep fruit fresh and extend fruit shelf-life.

Potassium permanganate is usually used as preservative, disinfectant, deodorant, or cleaning agent, etc. In gas cleaning, it can be used to remove sulfur, arsenic, phosphorus, silane, borane and sulfide. In the field of mining metallurgy, it can be used to separate molybdenum from copper, remove impurities contained in zinc and cadmium, and be used as oxidant for compound flotation. It also can be used as decolorizer for special fabric, wax, oil and resin, and as an adsorbent of gas mask, and stains for wood and copper, etc.

When potassium permanganate and polymers are combined, the obtained composite can absorb ethylene generated by fruits, thereby lengthening fruits ripening time, keeping fruits fresh, and improving fruit's oxygen barrier property as well. As potassium permanganate itself has a good efficiency to remove bacteria without polluting fruits, the obtained composite material is environmentally safe.

SUMMARY OF THE INVENTION

The present invention aims at developing a kind of polymer/potassium permanganate composite film and its preparation method to overcome the disadvantages of the prior art. Films prepared by this invention have excellent ethylene absorbing property, oxygen barrier property, bacteria resistance property, and could be widely used in packaging materials for foods and pharmaceuticals, etc.

What is disclosed here is a kind of polymer/potassium permanganate composite film, obtainable by using silane coupling agent for surface treatment of potassium permanganate, and mixing the treated potassium permanganate with a polymer together, and coating the mixture to obtain a composite film.

More specifically, the polymer/potassium permanganate composite film synthesis step is carried out according to the following procedure:

Step (1): use silane coupling agent for surface treatment of potassium permanganate;
Step (2): prepare a modified potassium permanganate solution;
Step (3): mix the modified potassium permanganate solution from step (2) with a polymer to obtain a mixed solution;
Step (4): coat the mixed solution obtained from step (3) and then vacuum dry it to obtain a polymer/potassium permanganate composite film.

In the above steps, the polymer is selected from one of the following: low density polyethylene, high density polyethylene, polypropylene, polyvinyl chloride, polyamide, thermoplastic polyurethane.

The steps (1)-(4) are accomplished in the following more specific manners:

Step (1): mix polymethylhydrosiloxane or KH-570 and zinc stearate with potassium permanganate well at a mass ratio in the range of 1-3:1-3:100, then heat the mixture under the temperature of 130-150° C. for 20-40 minutes to obtain a modified potassium permanganate;
Step (2): dissolve 0.15-0.75 g of modified potassium permanganate obtained from step (1) in 20 ml of N,N-dimethyl formamide or tetrahydrofuran, then ultrasonically disperse the mixture for 10-30 minutes to obtain a modified potassium permanganate solution;
Step (3): dissolve 10-20 g of polymers in 60 ml solvents, then allow the mixture to swell under the temperature of 70-90° C. for 10-14 hours, add modified potassium permanganate solution from step (2) into the mixture, stir it well to remove air bubbles, and then let it stand for a certain length of time to obtain a mixed solution;
Step (4): coat the mixed solution obtained from step (3) on a glass plate, vacuum dry it under the temperature of 60-70° C. for 15-25 minutes, then dry it under the temperature of 70-90° C. for 4-6 hours in a drum wind dryer, and finally allow it to cool down naturally.

The present invention offers the following significant advantages:

1) Films prepared by this invention have excellent ethylene absorbing property, oxygen barrier property, bacteria resistance property, and could be widely used in packaging materials for foods and pharmaceuticals, etc.
2) The preparation method is scientifically rational, simple and with a high level of operability, thus making it possible for batch preparation.

DESCRIPTION OF THE PREFERRED EMBODIMENTS

The present invention is further described in the following exemplified embodiments to illustrate the application of the principles of the invention. It is understood that the invention may be embodied otherwise without departing from such principles. The scope of the claims of the present invention expressly should not be limited to such exemplary or preferred embodiments.

Embodiment 1

This embodiment provides a process for preparing a low density polyethylene/potassium permanganate composite film, comprising the following steps:

Step (1): weigh 0.002 g of polymethylhydrosiloxane, 0.002 g of zinc stearate, and 0.15 g of potassium permanganate, mix them well, then heat the mixture under the temperature of 130° C. for 20 minutes in a vacuum drying oven to obtain a modified potassium permanganate;

Step (2): dissolve the obtained modified potassium permanganate from step (2) into 20 ml N,N-dimethyl formamide, then ultrasonically disperse the mixture for 20 minutes to obtain a modified potassium permanganate solution;

Step (3): dissolve 10 g low density polyethylene in 60 ml solvents, then allow the mixture to swell under the temperature of 70° C. for 10 hours, add the modified potassium permanganate solution from step (2) into the mixture, stir the mixture for 0.5 hours, then pour the mixture into a volumetric flask, suction filtrate the mixture to remove air bubbles, and then let it stand for 10 minutes to obtain a mixed solution;

Step (4): coat the mixed solution obtained from step (3) on a glass plate, vacuum dry it under the temperature of 60° C. for 15 minutes, and then dry it under the temperature of 70° C. for 4 hours in a drum wind dryer, finally allow it to cool down naturally to obtain a low density polyethylene/potassium permanganate composite film.

Embodiment 2

This embodiment provides a process for preparing a polyvinyl chloride/potassium permanganate composite film, comprising the following steps:

Step (1): weigh 0.004 g of KH-570 silane coupling agent, 0.004 g of zinc stearate, and 0.75 g of potassium permanganate, mix them well, then heat the mixture under the temperature of 150° C. for 40 minutes in a vacuum drying oven to obtain a modified potassium permanganate;

Step (2): dissolve the obtained modified potassium permanganate from step (1) into 20 ml tetrahydrofuran, then ultrasonically disperse the mixture for 40 minutes to obtain a modified potassium permanganate solution;

Step (3): dissolve 20 g of polyvinyl chloride in 60 ml solvents, then allow the mixture to swell under the temperature of 90° C. for 14 hours, add the modified potassium permanganate solution from step (2) into the mixture, stir the mixture for 1.5 hours, then pour the mixture into a volumetric flask, suction filtrate the mixture to remove air bubbles, and then let it stand for 10 minutes to obtain a mixed solution;

Step (4): coat the mixed solution obtained from step (3) on a glass plate, vacuum dry it under the temperature of 70° C. for 25 minutes, and then dry it under the temperature of 90° C. for 6 hours in a drum wind dryer, finally allow it to cool down naturally to obtain a polyvinyl chloride/potassium permanganate composite film.

Embodiment 3

This embodiment provides a process for preparing a thermoplastic polyurethane/potassium permanganate composite film, comprising the following steps:

Step (1): weigh 0.003 g of polymethylhydrosiloxane, 0.003 g of zinc stearate, and 0.45 g of potassium permanganate, mix them well, then heat the mixture under the temperature of 140° C. for 30 minutes in a vacuum drying oven to obtain a modified potassium permanganate;

Step (2): dissolve the obtained modified potassium permanganate from step (1) into 20 ml N,N-dimethyl formamide, then ultrasonically disperse the mixture for 30 minutes to obtain a modified potassium permanganate solution;

Step (3): dissolve 15 g thermoplastic polyurethane in 60 ml solvents, then allow the mixture to swell under the temperature of 80° C. for 12 hours, add the modified potassium permanganate solution from step (2) into the mixture, stir the mixture for 1 hours, then pour the mixture into a volumetric flask, suction filtrate the mixture to remove air bubbles, and then let it stand for 10 minutes to obtain a mixed solution;

Step 4: coat the mixed solution obtained from step (3) on a glass plate, vacuum dry it under the temperature of 65° C. for 20 minutes, and then dry it under the temperature of 80° C. for 5 hours in a drum wind dryer, finally allow it to cool down naturally to obtain a thermoplastic polyurethane/potassium permanganate composite film.

The above films have a thickness of 0.13±0.005 mm.

The properties of the obtained polymer/potassium permanganate composite film from the above embodiments have been tested.

(1) The Oxygen Permeance Test

The obtained composite film's oxygen permeance ratio was tested by the oxygen permeance measuring instrument produced by Guangzhou West Tang Electromechanical Co., LTD according to GB/T 1038-2000.

(2) The Oil Absorption Test

The obtained composite film was been processed into a slice of 0.13 mm×2.5 cm×2.5 cm, and then vacuum dried the slice under the temperature of 70° C. for 20 hours. The dried slice was weighed and recorded as $W_1$. Then the slice was immersed into a beaker containing a mixture of toluene and xylene. The beaker was heated in water bath at the temperature of 70° C. for 24 hours. Then the slice was taken out and quickly weighed, and the weight was recorded as $W_2$. The above test was repeated for 3 times. Take four samples in each group, and take the mean. The oil absorption ratio was calculated based on the formula:

oil absorption=$[(W_2-W_1)/W_1]$%.

(3) The Ethylene Absorption Test

First, the obtained composite film was used to make a packaging bag. Then fresh green ripe bananas were placed into the packaging bag and the bag was sealed. For comparison, same experiment was also carried out using a bag made of polymer film without potassium permanganate. The two bags were placed in an air dry oven under the temperature of 25° C. for 10 days. The color of banana peek was observed in the end of the experiment.

The test results of properties of the obtained films from the above embodiments are shown in Table 1:

| Test items | Embodiment 1 | Embodiment 2 | Embodiment 3 | Comparison experiment |
|---|---|---|---|---|
| Oxygen permeation rate/ cc/m².24 h.0.1 MPa | 238.45 | 347.76 | 231.45 | / |
| Oil absorption Rate (%) | 0.0013 | 0.0023 | 0.0011 | / |

| Test items | Embodiment 1 | Embodiment 2 | Embodiment 3 | Comparison experiment |
|---|---|---|---|---|
| Change of color of banana peels | Not yellow | Little yellow | Little yellow | Obviously yellow |

What is claimed is:

1. A process for preparing a polymer/potassium permanganate composite film, comprising the following steps:
   Step (1): mixing polymethylhydrosiloxane or KH-570 and zinc stearate with potassium permanganate well at a mass ratio of 1-3:1-3:100, then heating the mixture under the temperature of 130-150° C. for 20-40 minutes to obtain a modified potassium permanganate;
   Step (2): dissolving 0.15-0.75 g of modified potassium permanganate obtained from step (1) in 20 ml of N,N-dimethyl formamide or tetrahydrofuran, then ultrasonically dispersing the mixture for 10-30 minutes to obtain a modified potassium permanganate solution;
   Step (3): dissolving 10-20 g of polymer in 60 ml solvents, then swelling the mixture under the temperature of 70-90° C. for 10-14 hours, adding the modified potassium permanganate solution from step (2) into the mixture, stirring it well to remove air bubbles, and then letting it stand for a certain length of time to obtain a mixed solution;
   Step (4): coating the mixed solution obtained from step (3) on a glass plate, vacuum drying it under the temperature of 60-70° C. for 15-25 minutes, then drying it under the temperature of 70-90° C. for 4-6 hours in a drum wind dryer, and finally allowing it to cool down naturally.

2. The process of claim 1, wherein the polymer in step (3) is selected from one of the following: low density polyethylene, high density polyethylene, polypropylene, polyvinyl chloride, polyamide, thermoplastic polyurethane.

* * * * *